United States Patent
Cheng

(10) Patent No.: US 11,251,686 B2
(45) Date of Patent: Feb. 15, 2022

(54) RADIALLY ORIENTED SOLID CYLINDRICAL MAGNET AND PRODUCTION METHOD AND DEVICE THEREOF

(71) Applicant: Shenzhen Radimag Magnets Co.,Ltd, Shenzhen (CN)

(72) Inventor: Wenhao Cheng, Shenzhen (CN)

(73) Assignee: SHENZHEN RADIMAG MAGNETS CO., LTD, Shenzhen (CN)

( * ) Notice: Subject to any disclaimer, the term of this patent is extended or adjusted under 35 U.S.C. 154(b) by 41 days.

(21) Appl. No.: 16/888,060

(22) Filed: May 29, 2020

(65) Prior Publication Data
US 2020/0395830 A1    Dec. 17, 2020

(30) Foreign Application Priority Data

Jun. 11, 2019    (CN) .......................... 201910503141.8

(51) Int. Cl.
| | | |
|---|---|---|
| *H02K 15/03* | (2006.01) | |
| *H02K 1/27* | (2006.01) | |
| *B22F 3/12* | (2006.01) | |
| *B22F 3/16* | (2006.01) | |
| *H02K 1/2726* | (2022.01) | |
| *H02K 1/30* | (2006.01) | |
| *B22F 3/00* | (2021.01) | |

(52) U.S. Cl.
CPC ............... *H02K 15/03* (2013.01); *B22F 3/12* (2013.01); *B22F 3/16* (2013.01); *H02K 1/2726* (2013.01); *H02K 1/30* (2013.01); *B22F 3/00* (2013.01)

(58) Field of Classification Search
CPC ........ H02K 15/03; H02K 1/30; H02K 1/2726; B22F 3/00; B22F 3/12; B22F 3/16; H01F 41/0253; H01F 41/0266
See application file for complete search history.

(56) References Cited

U.S. PATENT DOCUMENTS

| | | | | |
|---|---|---|---|---|
| 4,990,306 A | * | 2/1991 | Ohashi | ................... H01F 1/0577 419/12 |
| 7,201,809 B2 | * | 4/2007 | Sato | ........................ H01F 7/021 148/101 |
| 2007/0245851 A1 | | 10/2007 | Sagawa et al. | |

FOREIGN PATENT DOCUMENTS

| | | |
|---|---|---|
| CN | 1488154 A | 4/2004 |
| CN | 200947369 Y | 9/2007 |
| CN | 101162616 A | 4/2008 |

(Continued)

*Primary Examiner* — Burton S Mullins
(74) *Attorney, Agent, or Firm* — Dragon Sun Law Firm, PC; Jinggao Li, Esq.

(57) ABSTRACT

The present disclosure provides a radially oriented solid cylindrical magnet, a method and device for molding and manufacturing the same, and a rotor and motor component using the same. The radial orientation degree of the solid cylindrical magnet is greater than or equal to 90%. A mold includes no mold core. Magnetic particles in the mold are continuously rotated in a magnetic field during molding, and an oriented magnetic field is applied during molding. The manufactured solid cylindrical magnet can be directly used as a rotor of a micro-motor to replace a conventional rotor with a radially oriented magnet ring, or can be used for producing radially oriented magnet rings with an arbitrary inner diameter, so as to obtain radially oriented magnet rings having an inner diameter less than 3 mm or even less for micro-motors.

12 Claims, 3 Drawing Sheets

(56) References Cited

FOREIGN PATENT DOCUMENTS

| | | |
|---|---|---|
| CN | 101162646 A | 4/2008 |
| CN | 101320608 A | 12/2008 |
| CN | 104493158 A | 4/2015 |
| JP | 09251922 A | 9/1997 |
| WO | 2018088393 A1 | 5/2018 |

* cited by examiner

RADIALLY ORIENTED SOLID CYLINDRICAL MAGNET AND PRODUCTION METHOD AND DEVICE THEREOF

CROSS-REFERENCE TO RELATED APPLICATION

The present application claims priority to Chinese Patent Application No. 201910503141.8 filed to the CNIPA on Jun. 11, 2019 and entitled RADIALLY ORIENTED SOLID CYLINDRICAL MAGNET AND PRODUCTION METHOD AND DEVICE THEREOF, the disclosure of which is hereby incorporated by reference in its entirety.

TECHNICAL FIELD

The present disclosure belongs to the field of magnetic materials, and relates to a radially oriented solid cylindrical magnet, and a method and device for molding and manufacturing the same.

BACKGROUND OF THE PRESENT DISCLOSURE

Permanent magnetic materials are important and widely-used functional materials. An important application field of the permanent magnetic materials is permanent magnetic motors. Permanent magnetic materials in the permanent magnetic motors are mostly mounted on motor shafts to provide a permanent magnetic field for the rotors. Motor rotors are generally circular, and the permanent magnetic field on the surface of the motor rotor is generally provided by multiple pairs of poles. Therefore, if parallel oriented permanent magnetic materials are used to produce permanent magnetic motors, it is required to machine the parallel oriented permanent magnetic materials into tiles and then adhere the permanent magnetic material tiles to the surface of the motor rotor by glue. The number of the permanent magnetic material tiles on the motor rotor is the same as that of poles of the designed magnetic field. Since the direction of orientation of most magnetic fields of the parallel oriented permanent magnetic material tiles is not the radial direction of the motor rotor, magnetic field components are generated in a non-radial direction of the motor rotor. During the high-speed rotation of the motor, these magnetic field components may lead to vibration, noise, temperature rise or the like of the motor. Therefore, a radially oriented circular permanent magnet material and a production method thereof have been proposed, for example in the inventor's earlier applications ZL200710106670.1, ZL200810066269.4 or the like. The radially oriented circular permanent magnet material enhances or improves certain characteristics of permanent magnetic motors since its direction of orientation is the same as the radial direction of the permanent magnetic motor shaft, so that the radially oriented circular permanent magnet material is widely applied.

Since the radially oriented circular permanent magnet material can enhance or improve certain characteristics of motors, the motors produced from the radially oriented circular permanent magnet material are widely applied in automatic devices, intelligent devices and robots. Miniaturization and microminiaturization are development trends in industries such as automatic devices, intelligent devices and robots. Miniature devices require micro-motors. If radially oriented magnet rings are used to produce micro-motors, it is necessary to ensure that the radially oriented magnet rings must be micron-sized. However, in existing processes for producing radially oriented magnet rings, for example those described in the inventor's earlier applications ZL200710106670.1 and ZL200810066269.4 and Japanese patent CN03823303.7 by Shin Etsu, a mold core, which is magnetic conducting and made of a ferromagnetic material, must be arranged in the center of a mold, so that radially oriented magnet rings can be produced. The radially oriented magnet rings to be used in micro-motors are relatively small in diameter and even smaller in inner diameter. It is almost impossible to produce radially oriented magnet rings having an inner diameter less than 3 mm or even less by processes described in patents ZL200710106670.1, ZL200810066269.4, CN03823303.7 or the like.

Therefore, a heretofore unaddressed need exists in the art to address the aforementioned deficiencies and inadequacies.

SUMMARY OF THE PRESENT DISCLOSURE

The easy directions of magnetization of anisotropic magnetic particles will be arranged in a magnetic field. The higher the intensity of the magnetic field, the higher the degree of order, and the better the magnetic performance of the final magnet. However, after the external magnetic field disappears, the magnetic particles will naturally recover to the out-of-order state from the in-order state. Therefore, to produce radially oriented solid cylindrical magnets, the following two problems must be solved. One problem is to radially orient the easy directions of magnetization of the anisotropic magnetic particles in a mold cavity; and the other problem is to disenable the easy directions of magnetization of the anisotropic magnetic particles in the mold cavity to recover to the out-of-order state before orientation from the radially-oriented state after the oriented magnetic field disappears.

To solve the two problems, the present disclosure provides a method that integrates the magnetic principle with the mechanical principle. In this method, the radial alignment of the easy directions of magnetization of the anisotropic magnetic particles in the mold cavity is realized by the magnetic principle, and disenabling the easy directions of magnetization of the anisotropic magnetic particles in the mold cavity to recover to the out-of-order state before orientation from the radially-oriented state after the oriented magnetic field disappears is realized by the mechanical principle.

In view of this, a first technical solution of the present disclosure is to provide a radially oriented solid cylindrical magnet, wherein the degree of radial orientation of the solid cylindrical magnet is greater than or equal to 90%; and, the diameter D of the solid cylindrical magnet and the width W of an oriented magnetic field satisfy the following relationship: $W = nD + W0$, where n is 0.05 to 5, W0 is 0.1 to 1, and the width W of the oriented magnetic field is the width of a parallel magnetic field in the center of poles for the oriented magnetic field; and the solid magnet is a radially anisotropic magnet.

The reason to provide the above relationship is that: the width of poles is closely related to the magnetic conductivity of the poles, and the easy directions of magnetization of anisotropic magnetic particles will be arranged along the magnetic field. The higher the intensity of the magnetic field, the higher the degree of order, and the better the magnetic performance of the final magnet. However, the smaller the width of the poles is, the lower the magnetic flux passing through the poles is, and the lower the intensity of the quasi-2D magnetic field formed between the poles is. Accordingly, the orientation degree of the easy directions of magnetization of the anisotropic magnetic particles in the magnetic field will be reduced, and it is disadvantageous for the production of radially oriented solid magnets with high magnetic performance.

The radially oriented solid magnet provided by the present disclosure can be directly used in a micro-motor rotor to replace a rotor with a radially oriented magnet ring, or can be used as a radially oriented magnet ring by forming a hole with a desired diameter (an arbitrarily small inner diameter) in the center of the produced radially oriented solid cylindrical magnet, so that radially oriented magnet ring having an inner diameter less than 3 mm or less for micro-motor can be produced.

A second technical solution of the present disclosure is to provide a method for molding the radially oriented solid cylindrical magnet, wherein a mold without a mold core; a quasi-2D oriented magnetic field is applied during molding; and magnetic particles in the mold cavity are continuously rotated in the magnetic field during molding. Particularly, a magnetic field that changes by stages is applied during molding, including: a first magnetic field applied to fully magnetize the magnetic particles in a mold cavity, a second magnetic field applied to enable the fully-magnetized magnetic particles in the mold cavity to continuously rotate in the quasi-2D oriented magnetic field, a third magnetic field applied when the density of a blank in the mold cavity reaches a level at which the magnetic particles cannot be rotated freely after leaving the oriented magnetic field, and a fourth magnetic field applied to enable the blank in the mold cavity to have a desired density, with the intensity of the first magnetic field being 1 to 3 times of that of the second magnetic field, the intensity of the third magnetic field being 0 to 1 time of that of the second magnetic field and the intensity of the fourth magnetic field being 0.5 to 0.01 times that of the second magnetic field.

In the present disclosure, no magnetic conducting rod (i.e., a mold core) is arranged in the center of the mold. However, conventionally, for example in patents ZL200710106670.1, ZL200810066269.4, CN03823303.7 or the like, a magnetic conducting rod is inserted in the cylindrical mold to radially apply bundles of magnetism from its center, wherein the smaller the inner diameter of the cylinder is, the smaller the diameter of the inserted magnetic conducting rod is and the smaller the applied bundles of magnetism is, so that the size of the inner diameter of the molded cylindrical magnet is seriously limited. By contrast, in the present disclosure, the mold core is removed to produce miniature cylindrical magnets directly applied to micro-motor rotors in a large scale, so that radially oriented cylindrical magnet rings having an inner diameter less than 3 mm or even less for micro-motors can be produced.

The molding method specifically includes following steps of:

(1) preparing a mold without a mold core;

(2) mounting the prepared mold in a magnetic field generation device perpendicular to a cylindrical surface of the mold;

(3) filling anisotropic magnetic particles in a mold cavity;

(4) applying a first magnetic field and then continuously rotating the mold and the magnetic particles in the mold cavity; or, continuously rotating the mold and the magnetic particles in the mold cavity and then applying a first magnetic field;

(5) applying a second magnetic field, applying an increased stress to the magnetic particles in the mold cavity by upper and lower rams during the continuous rotation of the mold and the magnetic particles in the mold cavity, and maintaining this stress for a certain period of time to obtain a blank; or, by keeping the lower ram unmoved, moving the upper ram down to apply an increased stress to the magnetic particles in the mold cavity and maintaining this stress for a certain period of time; or, by keeping the upper ram unmoved, moving the lower ram up to apply an increased stress to the magnetic particles in the mold cavity and maintaining this stress for a certain period of time, the certain period of time being the time required for the mold to rotate in at least one circle, and the stress being preferably 5 MPa to 200 MPa;

(6) in the step (5), when the density of the blank in the mold cavity reaches a level at which the magnetic particles cannot be rotated freely after leaving the oriented magnetic field, applying a third magnetic field, and continuously applying a stress by the rams until the blank has a desired density;

(7) applying a fourth magnetic field to demagnetize the blank; and preferably, applying a reverse magnetic field to the blank in the mold cavity to demagnetize the blank, or applying a forward/reverse alternating magnetic field to demagnetize the blank in the mold cavity; and (8) stopping the application of stress, stopping the rotation of the mold, and demolding to obtain the blank.

Particularly, after the step (3), the upper ram of the mold is moved to a position in the mold cavity at the same height as upper edge of poles for the oriented magnetic field or a position slightly lower than the upper edge of the poles for the oriented magnetic field. This position ensures that the magnetic particles in the mold cavity are fully magnetized after the application of the first magnetic field and will not flow out of the mold cavity during the rotation of the mold and/or the magnetization by the magnetic field, and also ensures that the magnetic particles in the mold cavity have a degree of freedom high enough to provide alignment of the easy directions of magnetization in the magnetic field. Non-uniform magnetic performance resulted from the non-uniformity of the oriented magnetic field can be well solved by the continuous rotation of the magnetic particles.

The magnetic field generation device is configured to provide an oriented magnetic field, and includes two magnetic poles arranged symmetrically. The mold includes a mold sleeve, a mold cavity, an upper ram and a lower ram, without a mold core. The mold is made from a non-ferromagnetic material in order to ensure that the magnetic field can go through the mold cavity from the pole on one side of the mold to the pole on the other side of the mold.

The central part of the magnetic field between a pair of poles (i.e., an N pole and an S pole) is a parallel magnetic, and there is an arc magnetic field around the parallel magnetic field, so that no radial magnetic field is generated in any case. Due to the absence of the radial magnetic field, the easy directions of magnetization of the magnetic particles in the mold cavity cannot be radially aligned. Therefore, through many years of exploration, trial and development, the inventor's team innovatively proposes that a quasi-2D oriented magnetic field is applied during molding. The width of the parallel magnetic field in the center of poles for the oriented magnetic field is decreased to a level at which there is only an approximately 2D (i.e., axial and radial) oriented magnetic field, so that the alignment of the easy directions of magnetization of the anisotropic magnetic particles in the mold cavity along a quasi-radial direction in the quasi-2D oriented magnetic field is ensured. Meanwhile, the important relationship between the diameter D of the solid cylindrical magnet and the width W of the oriented magnetic field is firstly proposed, that is, $W=nD+W0$, where n is 0.05 to 5 and W0 is 0.1 to 1. The radial orientation degree of the solid cylindrical magnet is greater than or equal to 90%, and the width of the oriented magnetic field is the width of the parallel magnetic field in the center of poles for the oriented magnetic field.

Particularly, after the step (3), the upper ram of the mold is moved to a position in the mold cavity at the same height as upper edge of poles for the oriented magnetic field or a position slightly lower than the upper edge of the poles for the oriented magnetic field. This position ensures that the magnetic particles in the mold cavity are fully magnetized after the application of the first magnetic field and will not flow out of the mold cavity during the rotation of the mold and/or the magnetization by the magnetic field, and also ensures that the magnetic particles in the mold cavity have a degree of freedom high enough to provide alignment of the easy directions of magnetization in the magnetic field. In the step (4), a magnetic field generation device firstly applies a first magnetic field to fully magnetize the magnetic particles in the mold cavity. The higher the intensity of the magnetic field is, the higher the degree of magnetization of the magnetic particles is, and the more beneficial the subsequent rotation and orientation is. In the step (5), during the continuous rotation of the magnetic particles in the mold cavity, the magnetic field generation device applies a second magnetic field to radially arrange the easy directions of magnetization of the magnetic particles in the mold cavity. Since the arc magnetic field around the quasi-2D oriented magnetic field will be higher in intensity if the intensity of the magnetic field is higher, which affects the radial alignment of the magnetic particles, the intensity of the second magnetic field should be lower than that of the first magnetic field, that is, the intensity of the first magnetic field is 1 to 3 times of that of the second magnetic field. In the step (5) during the application of the second magnetic field and the continuous rotation of the magnetic particles in the mold cavity with the mold, a gradually increased stress is applied to the magnetic particles until the stress is increased to a certain level at which the magnetic particles in the mold cavity are radially aligned. In the step (5), when the density of the blank reaches a level at which the magnetic particles cannot be rotated freely after leaving the "quasi-2D oriented magnetic field", a third magnetic field is applied. In this stage, the anisotropic magnetic particles in the mold cavity have been aligned radially, and the magnetic particles cannot recover to the out-of-order state before orientation after leaving the "quasi-2D oriented magnetic field". Therefore, to save energy and to facilitate the application of a fourth magnetic field to the blank, the intensity of the third magnetic field is 1 to 0 times of that of the second magnetic field. The stress is continuously applied by the rams until the blank in the mold has a desired density. The magnetic field generation device applies a fourth magnetic field to demagnetize the blank. Preferably, the fourth magnetic field is a reverse magnetic field having an intensity that is 0.5 to 0.01 times of that of the second magnetic field or a forward/reverse alternating magnetic field. Subsequently, the application of stress is stopped, the rotation is stopped, and demolding is performed to obtain the blank of the radially oriented solid cylindrical magnet.

A fourth technical solution of the present disclosure is to provide a method for manufacturing a radially oriented solid cylindrical sintered magnet, including steps of: molding a blank of the radially oriented solid cylindrical magnet blank by the method described above; and, sintering and aging, specifically including following steps of:

(i) vacuumizing, in advance, to below 10-2 Pa;
(ii) heating, while vacuumizing, to a sintering temperature of 1000° C. to 1120° C.;
(iii) sintering in vacuum and maintaining the temperature;
(iv) feeding an inert gas (e.g., Ar, or N2, etc.) and cooling; and
(vi) aging at 400° C. to 600° C., or aging at about 850° C. to 950° C. and then aging at 400° C. to 600° C.

A fifth technical solution of the present disclosure is to provide a method for manufacturing a radially oriented solid cylindrical bonded magnet, including steps of:

(1) molding a blank of the radially oriented solid cylindrical magnet blank by the method described above; and
(2) heat treating to solidify an adhesive in the bonded magnet.

A sixth technical solution of the present disclosure is to provide a molding device using the method provided by the present disclosure, including a mold, a rotating device, a magnetic field generation device and a stress applying device, wherein the mold includes a mold sleeve, a mold cavity, an upper ram and a lower ram, without a mold core; the magnetic field generation device provides an oriented magnetic field discontinuously distributed around the magnet within 360°, and includes at least two outer poles arranged symmetrically; magnetic particles in the mold cavity are continuously rotated during molding; the rotating device drives the mold and the magnetic particles in the mold cavity to continuously rotate in the magnetic field while the magnetic field generation device is kept unmoved, or drives the magnetic field generation device to rotate while the mold is kept unmoved, or drives both the mold and the magnetic field generation device to rotate simultaneously at different speeds.

In the present disclosure, the oriented magnetic field may be an electromagnetic field, a permanent magnetic field, or a mixed magnetic field formed by the both.

The present disclosure has the following remarkable technical effects.

(1) A method that integrates the magnetic principle with the mechanical principle is used. That is, the radial alignment of the easy directions of magnetization of anisotropic magnetic particles in the mold cavity is realized by the magnetic principle, and disenabling the easy directions of magnetization of the anisotropic magnetic particles in the mold cavity to recover to the out-of-order state before orientation from the radially-aligned state after the oriented magnetic field disappears is realized by the mechanical principle.

(2) The present disclosure innovatively proposes that a quasi-2D oriented magnetic field is applied during the molding of the radially oriented solid cylindrical magnet, that is, the width of the parallel magnetic field in the center of poles for the oriented magnetic field is decreased to a level at which there is only an approximately 2D (i.e., axial and radial) oriented magnetic field, so that the radial alignment of the easy directions of magnetization of the anisotropic magnetic particles in the mold cavity along the quasi-2D oriented magnetic field is ensured. Meanwhile, the relationship between the width W of the oriented magnetic field and the diameter D of the solid cylindrical magnet is specified, so that the radial alignment of the easy directions of magnetization of the anisotropic magnetic particles in the mold cavity can be effectively ensured, the radially oriented solid cylindrical magnet having a radial orientation degree greater than or equal to 90% is obtained, and excellent magnetic performance of the radially oriented solid magnet is ensured.

(3) The present disclosure provides a large-scale production method for radially oriented cylindrical magnets with a small diameter (or inner diameter) for micro-motor rotors, and solves the problem that the size of the inner diameter of the existing molded cylindrical magnet is seriously limited. Integrated radially oriented solid cylindrical magnets can be produced, and radially oriented magnet rings with an arbitrary inner diameter can also be produced, so that radially oriented magnet rings having an inner diameter less than 3 mm or even less for micro-motors are obtained. It is of great significance in the field of miniature magnet manufacturing.

(4) During the molding process, by applying an oriented magnetic field that changes by stages, on one hand, it is ensured that the magnetic particles are always oriented along the radial direction of the solid cylinder, and there is little or even no magnetic declination of the orientated magnetic field, so that it is advantageous for fully orientation of the magnetic particles and it is more advantageous to achieve better magnetic performance; and on the other hand, the electromagnetic energy is saved, and the cost for mass production of magnets is reduced, leading to a promising industrial application prospect.

(5) Non-uniform or reduced magnetic performance resulted from the non-uniformity of the oriented magnetic field can be better solved by the continuous rotation of the mold and the magnetic particles during the molding process.

(6) The method is high in applicability, and suitable for preparing anisotropic sintered magnets in low cost and also suitable for preparing bonded magnets, particularly suitable for molding cylindrical or polyhedral magnets such as neodymium iron boron and ferrite, without any limitations to the type of the used magnetic particles. The obtained radially orientated solid cylindrical magnet can be magnetized to obtain any multi-pole, and the poles can also be inclined at an unlimited angle of inclination (i.e., the angle between the poles and the bottom surface of the magnet).

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Figure 1:
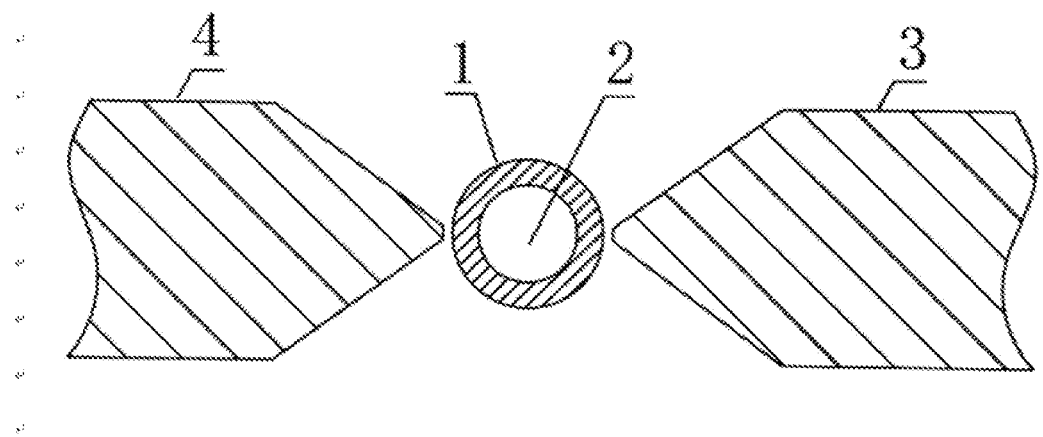
FIG. 1 is a schematic view of preparation of a radially oriented solid cylindrical magnet according to the present disclosure.

in which: 1: sleeve; 2: cavity; 3: magnetic pole; 4: magnetic pole; 5: upper ram; and, 6: lower ram.

DETAILED DESCRIPTION OF THE PRESENT DISCLOSURE

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the disclosure to those skilled in the art. Like reference numerals refer to like elements throughout.

The present disclosure will be further described below in detail by specific implementations, and the protection scope of the present disclosure is not limited thereto.

Embodiment 1

A method for manufacturing a radially oriented solid cylindrical sintered magnet is provided, including the following steps.

(1) RFeB typed magnetic particles to be molded are prepared. The magnetic particles include the following specific components (wt %): 29% to 32% of rare-earth PrNd, 0.5% to 6% of one or more of Dy, Tb, Ho and Tb, 0.5% to 3% of Co, 0.9% to 1.15% of B, 1% or less of Nb, 2% or less of Zr, 1.0% or less of Ti, 1.0% or less of Cu, 1.0% or less of Al, and the remaining of Fe and inevitable impurities.

(2) The magnetic particles are conventionally melted in a vacuum furnace and then cast to obtain an ingot or a rapidly-quenched ribbon.

(3) The ingot is crushed or the rapidly-quenched ribbon is treated by conventional pulverizing methods such as coarse crushing and jet milling to obtain micron-sized magnetic particles. Preferably, the magnetic particles have an average particle size of less than 5.5 µm.

(4) According to the desired size of the solid cylindrical magnet to be molded, a corresponding cylindrical mold is designed and prepared (as shown in FIG. 1). The mold is made from non-ferromagnetic material, ensuring that the magnetic field can go through the mold cavity from one side to the other side. The mold includes a mold sleeve 1, a mold cavity 2, an upper ram 5 and a lower ram 6, without a mold core.

(5) The prepared mold is mounted in a magnetic field generation device perpendicular to the cylindrical surface of the magnet. The magnetic field generation device is arranged around the mold, and includes two magnetic poles 3 and 4 arranged symmetrically. When the width W of an oriented magnetic field formed by the two magnetic poles (i.e., the width of a parallel magnetic field in the center of poles for the oriented magnetic field, in unit of mm) and the diameter D (in unit of mm) of the cylindrical solid magnet satisfy the following relationship: $W=nD+W0$ (where n is a constant ranging from 0.05 to 5, W0 is a corrected value ranging from 0.1 mm to 1 mm), the radial alignment of the easy directions of magnetization of the anisotropic magnetic particles in the mold cavity can be ensured, and a radially oriented solid magnet having a radial orientation degree greater than or equal to 85% (preferably greater than or equal to 91%, and most preferably 100%) is obtained.

(6) The magnetic particles prepared in the step (3) are filled in the mold cavity 2, and the upper ram 5 of the mold is moved to a position in the mold cavity 2 at the same height as upper edge of the poles for the oriented magnetic field or a position slightly lower than the upper edge of the poles for the oriented magnetic field. This position ensures that the magnetic particles in the mold will not flow out of the mold cavity during the rotation of the mold and/or the magnetization by the magnetic field, and also ensures that there is enough space for the magnetic particles in the mold to continuously rotate in the magnetic field. The magnetic field generation device is activated to generate an oriented magnetic field. The first magnetic field has an intensity of 3 KGs to 15 KGs (preferably 5 KGs to 12 KGs), to fully magnetize the magnetic particles in the mold cavity. The higher the intensity of the magnetic field is, the higher the degree of magnetization of the magnetic particles is, and the more beneficial the subsequent rotation and orientation is. Subsequently, the mold and the magnetic particles in the mold cavity are continuously rotated. At this time, a second magnetic field having an intensity lower than that of the first magnetic field (specifically 1 KGs to 10 KGs, preferably 1 KGs to 5 KGs) is applied to radially align the easy directions of magnetization of the magnetic particles in the mold cavity. The higher the intensity of the magnetic field is, the higher the arc magnetic field around the quasi-2D oriented magnetic field is, which affects the radial alignment of the magnetic particles.

(7) A gradually increased stress is applied to the magnetic particles in the mold cavity 2 by both the upper and lower rams 5, 6; or, the lower ram 6 is kept unmoved and the upper ram 5 is moved down to apply a gradually increased stress to the magnetic particles in the mold cavity 2. The stress is provided by a conventional stress applying device (not shown). When the stress is increased to a certain level, the frictional force fresistance between the anisotropic magnetic particles in the mold cavity is greater than the recovery force frecovery required for the recovery of the easy directions of magnetization of the magnetic particles from the in-order state to the out-of-order state, but less than the orientation force forientation to the anisotropic magnetic particles by the "quasi-2D oriented magnetic field", and the stress is maintained for a certain period of time, so that all the anisotropic magnetic particles in the mold cavity are radially aligned. The stress is preferably 50 MPa to 100 MPa, and the stress maintaining duration is the time required for the mold to rotate in at least one cycle, preferably 1 min to 120 min. When the blank has a desired density, the application of the oriented magnetic field to the blank is weakened until it is stopped, and the application of stress is stopped. When the density of the blank reaches a level at which the magnetic particles cannot be rotated freely after leaving the quasi-2D oriented magnetic field, a third magnetic field having an intensity of 5 KGs to 0 KGs (preferably 3 KGs to 0 KGs) is applied. In this stage, the anisotropic magnetic particles in the mold cavity have been aligned radially, and the magnetic particles cannot recover to the out-of-order stage before orientation after leaving the quasi-2D oriented magnetic field.

(8) The molded blank is demagnetized. A stress is continuously applied by the rams until the blank in the mold cavity has a desired density, and the magnetic field generation device applies a fourth magnetic field, which is a reverse magnetic field having an intensity that is 0.5 to 0.01 times of that of the second magnetic field or a forward/reverse alternating magnetic field, to demagnetize the molded blank. The intensity of the fourth magnetic field is specially 5 KGs to 0.01 KGs, preferably 2.5 KGs to 0.01 KGs.

(9) The rotation of the mold is stopped, and demolding is performed to obtain the molded blank of the solid cylindrical magnet.

(10) The molded magnet blank is sintered and aged, specifically including steps of:

(i) vacuumizing, in advance, a sintering furnace to below 10-2 Pa;

(ii) heating, while vacuumizing, to a sintering temperature of 1000° C. to 1120° C.;

(iii) sintering in vacuum and maintaining the temperature for 30 min to 3 h;

(iv) feeding inert gas nitrogen and cooling; and (vi) aging at 400° C. to 600° C. for 0.5 h to 4 h, or aging at about 850° C. to 950° C. for 0.5 h to 2 h and then aging at 400° C. to 600° C. for 0.5 h to 4 h. Thus, a radially oriented solid cylindrical sintered magnet having an orientation degree greater than 91% (most preferably 100%) and excellent magnetic performance is obtained. The magnet can be magnetized to obtain any multi-pole, and the poles can also be inclined at an unlimited angle of inclination (i.e., the angle between the poles and the bottom surface of the magnet).

Figure 4:
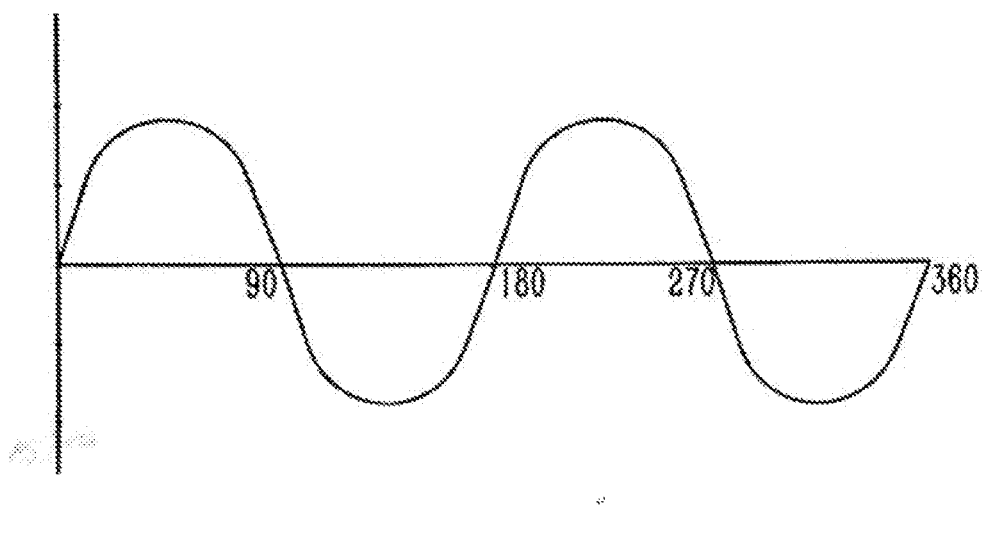
FIG. 4 shows a magnetization waveform of four poles of the radially oriented solid cylindrical magnet according to the present disclosure.

FIG. 4 shows a magnetization waveform of four poles of the radially oriented solid cylindrical magnet prepared in this embodiment.

In this embodiment, the magnetic field generation device is kept unmoved, and the rotating device (not shown in FIG. 1) drives the mold and the magnetic particles in the mold cavity to continuously rotate in the magnetic field; or, the rotating device drives the magnetic field generation device to rotate while the mold is kept unmoved, or drives both the mold and the magnetic field generation device to rotate simultaneously at different speeds.

Embodiment 2

Figure 2:
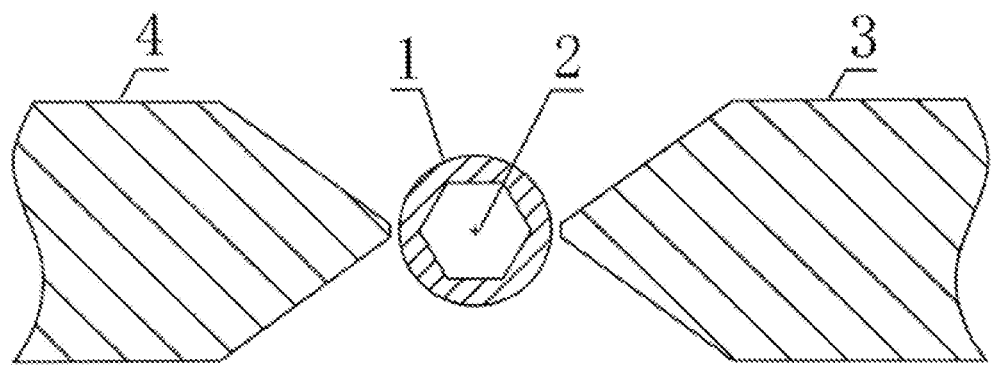
FIG. 2 is a schematic view of preparation of a radially oriented solid polyhedral magnet according to the present disclosure.
Figure 3:
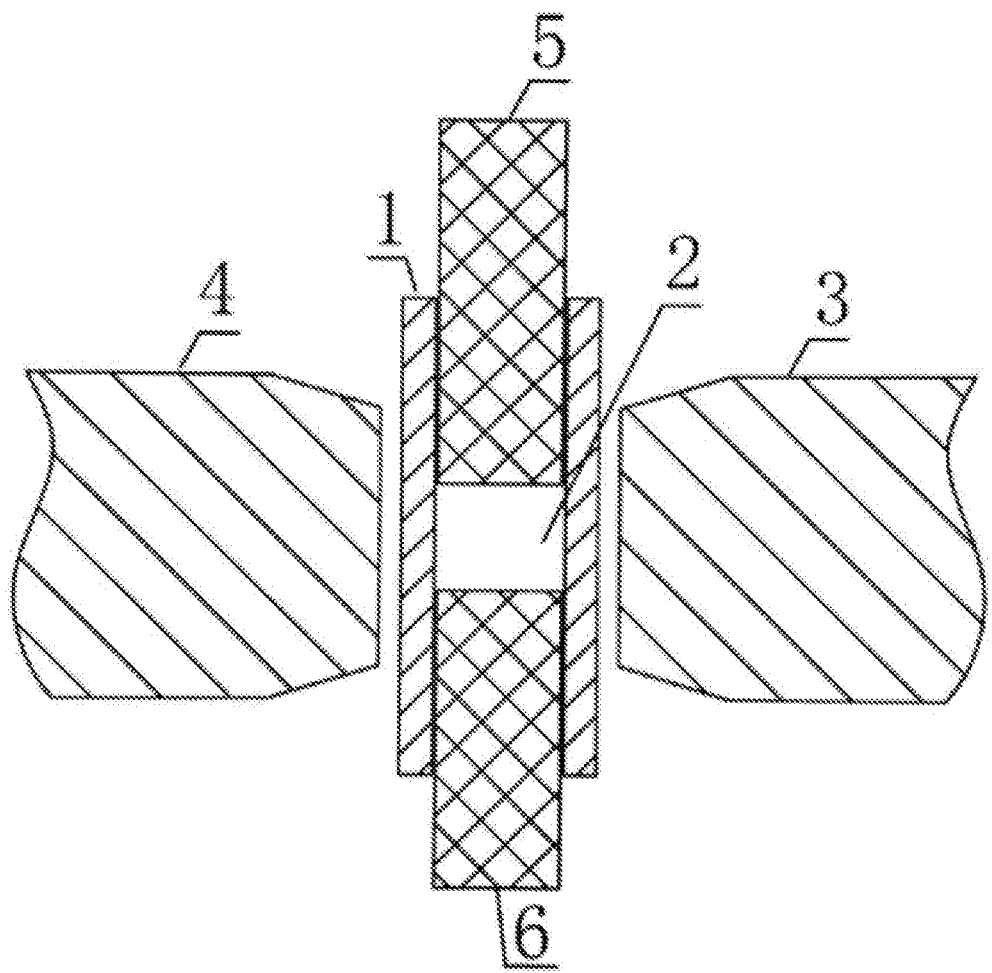
FIG. 3 is a sectional view of preparation of the radially oriented solid cylindrical magnet according to the present disclosure.

A radially oriented solid polyhedral sintered magnet is manufactured by a process the same as that in Embodiment 1. This embodiment differs from Embodiment 1 in that, in the step (4), a corresponding polyhedral mold, without a mold core, is designed and prepared according to the desired size of the solid polyhedral sintered magnet to be molded (as shown in FIG. 2). By the steps (1) to (10), a radially oriented solid polyhedral sintered magnet having an orientation degree greater than 85% and high radial uniformity is obtained.

Embodiment 3

A radially oriented solid cylindrical bonded magnet is manufactured by a process the same as that in Embodiment 1. This embodiment differs from Embodiment 1 in that an adhesive is added in advance to the magnetic particles obtained in the step (6), and conventional heat treating is performed in the step (10) to solidify the adhesive in the bonded magnet. In this way, a solid cylindrical bonded magnet having an orientation degree greater than 90% and high radial uniformity is obtained.

It is to be particularly noted that the present disclosure can also produce radially oriented cylindrical or polyhedral magnets such as samarium cobalt, ferrite and bonded neodymium iron boron by changing the type of anisotropic magnetic particles in the mold cavity.

The forgoing embodiments merely show preferred implementations of the present disclosure, and should not be interpreted as limiting the protection scope of the present disclosure. It is to be noted that various alterations, replacements and improvements may be made by a person of ordinary skill in the art without departing from the concept of the present disclosure, and these alterations, replacements and improvements shall fall into the protection scope of the present disclosure.

What is claimed is:

1. A method for molding a radially oriented solid cylindrical magnet, comprising the following steps:
applying a quasi-2D oriented magnetic field during molding,
wherein the quasi-2D oriented magnetic field is generated by decreasing the width W of a parallel magnetic field in the center of poles for an oriented magnetic field;
the diameter D of the radially oriented solid cylindrical magnet and the width W of the parallel magnetic field satisfy the following relationship: $W=nD+W_0$, where n is 0.05 to 5 and $W_0$ is 0.1 mm to 1 mm;
a mold has no mold core, and magnetic particles in a mold cavity are continuously rotated in the quasi-2D magnetic field during molding;
a magnetic field that changes by stages is applied during molding, comprising: a first magnetic field applied to fully magnetize the magnetic particles in the mold cavity, a second magnetic field applied to enable the fully-magnetized magnetic particles in the mold cavity to continuously rotate in the quasi-2D oriented magnetic field, a third magnetic field applied when the density of a blank in the mold cavity reaches a level at which the magnetic particles cannot be rotated freely after leaving the oriented magnetic field, and a fourth magnetic field applied to enable the blank in the mold cavity to have a desired density; and
the intensity of the first magnetic field is 1 to 3 times of that of the second magnetic field, the intensity of the third magnetic field is 1 to 0 times of that of the second magnetic field and the intensity of the fourth magnetic field is 0.5 to 0.01 times that of the second magnetic field.

2. The method for molding a radially oriented solid cylindrical magnet according to claim 1, wherein the magnetic particles are anisotropic.

3. A molding device using the method according to claim 1, comprising:
a mold, a magnetic field generation device, a rotating device and a device for applying stress by upper and lower rams;
the mold comprises a mold sleeve, a mold cavity, an upper ram and a lower ram, without a mold core;
the magnetic field generation device provides an oriented magnetic field discontinuously distributed around the mold sleeve within 360°, and comprises at least two outer poles arranged symmetrically, a quasi-2D oriented magnetic field is applied during molding, wherein the quasi-2D oriented magnetic field is generated by decreasing the width W of the parallel magnetic field in the center of poles for the oriented magnetic field; and the diameter D of the radially oriented solid cylindrical magnet and the width W of the parallel magnetic field satisfy the following relationship: $W=nD+W_0$, where n is 0.05 to 5 and $W_0$ is 0.1 mm to 1 mm, and the width of the oriented magnetic field is the width W of the parallel magnetic field in the center of poles for the oriented magnetic field;
the rotating device drives the mold and magnetic particles in the mold cavity to continuously rotate in the magnetic field while the magnetic field generation device is kept unmoved, or drives the magnetic field generation device to rotate while the mold is kept unmoved, or drives both the mold and the magnetic field generation device to rotate simultaneously at different speeds.

4. A method for molding a radially oriented solid cylindrical magnet, comprising the following steps:

(1) preparing a mold without a mold core;
(2) mounting the prepared mold in a magnetic field generation device perpendicular to a cylindrical surface of the mold, the magnetic field generation device comprising at least two outer poles arranged symmetrically; and applying a quasi-2D oriented magnetic field during molding, wherein the quasi-2D oriented magnetic field is generated by decreasing the width W of the parallel magnetic field in the center of poles for the oriented magnetic field, the diameter D of the radially oriented solid cylindrical magnet and the width W of the parallel magnetic field satisfy the following relationship: $W=nD+W_0$, where n is 0.05 to 5 and $W_0$ is 0.1 mm to 1 mm, and the mold comprises a mold sleeve, a mold cavity, an upper ram and a lower ram;
(3) filling anisotropic magnetic particles in the mold cavity;
(4) applying a first magnetic field and then continuously rotating the mold and the magnetic particles in the mold cavity; or, continuously rotating the mold and the magnetic particles in the mold cavity and then applying a first magnetic field;
(5) applying a second magnetic field, continuously rotating the mold and the magnetic particles in the mold cavity, and further
applying an increased stress to the magnetic particles in the mold cavity by both the upper and lower rams, and maintaining this stress for a certain period of time to obtain a blank; or
applying the increased stress by keeping the lower ram unmoved, moving the upper ram down to apply an increased stress to the magnetic particles in the mold cavity and maintaining this stress for a certain period of time; or
applying the increased stress by keeping the upper ram unmoved, moving the lower ram up to apply an increased stress to the magnetic particles in the mold cavity and maintaining this stress for a certain period of time, the certain period of time being the time required for the mold to rotate in at least one circle;
(6) when the density of the blank in the mold cavity reaches a level at which the magnetic particles cannot be rotated freely after leaving the oriented magnetic field, applying a third magnetic field, and continuously applying a stress by the rams until the blank has a desired density;
(7) after the blank in the mold cavity has a desired density, applying a fourth magnetic field to demagnetize the blank; and
(8) stopping the application of stress, stopping the rotation of the mold, and demolding to obtain the blank.

5. The method according to claim 4, wherein, after the step (3), the upper ram of the mold is moved to a position in the mold cavity at the same height as upper edge of poles for the oriented magnetic field or a position slightly lower than upper edge of poles for the oriented magnetic field.

6. The method according to claim 4, wherein, in the step (4), the magnetic field generation device firstly applies the first magnetic field to fully magnetize the magnetic particles in the mold cavity, and then applies the second magnetic field when the fully-magnetized magnetic particles in the mold cavity are continuously rotated in the quasi-2D oriented magnetic field, the intensity of the first magnetic field being 1 to 3 times of that of the second magnetic field; in the step (5), a gradually increased stress is applied to the magnetic particles during continuous rotation until the stress is increased to a certain level, and the magnetic particles in the mold cavity are always in the quasi-2D oriented magnetic field during the application of the gradually increased stress; in the step (6), the intensity of the applied third magnetic field is 1 to 0 times of that of the second magnetic field; and, in the step (7), after the blank in the mold cavity has a desired density, the intensity of the applied fourth magnetic field is 0.5 to 0.01 times of that of the second magnetic field.

7. The method according to claim 4, wherein the stress in the step (5) is 5 MPa to 200 MPa.

8. The method according to claim 4, wherein the demagnetizing in the step (7) is applying a reverse magnetic field to the blank in the mold cavity to demagnetize the blank, or applying a forward/reverse alternating magnetic field to demagnetize the blank in the mold cavity.

9. A method for radially oriented solid cylindrical sintered magnet, comprising steps of:
(1) molding a blank by the method according to claim 4; and
(2) sintering and aging.

10. The method according to claim 9, wherein the sintering and aging comprises specific steps of:
(i) vacuumizing, in advance, to below 10-2 Pa;
(ii) heating, while vacuumizing, to a sintering temperature of 1000° C. to 1 120° C.;
(iii) sintering in vacuum and maintaining the temperature;
(iv) feeding an inert gas and cooling; and
(v) aging at 400° C. to 600° C., or aging at 850° C. to 950° C. and then aging at 400° C. to 600° C.

11. A micro-motor rotor, wherein the radially oriented solid cylindrical magnet manufactured by the method according to claim 9 is directly used as a micro-motor rotor.

12. A method for radially oriented solid cylindrical bonded magnet, comprising steps of:
(1) molding a blank by the method according to claim 4; and
(2) heat treating to solidify an adhesive in the bonded magnet.

* * * * *